US008800135B2

(12) United States Patent
Riggsby et al.

(10) Patent No.: US 8,800,135 B2
(45) Date of Patent: Aug. 12, 2014

(54) STINGER CUTTING GUIDE

(75) Inventors: Robert R. Riggsby, Sandy Springs, GA (US); William G. Mahoney, Suwanee, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 223 days.

(21) Appl. No.: 11/426,659

(22) Filed: Jun. 27, 2006

(65) Prior Publication Data

US 2007/0294884 A1 Dec. 27, 2007

(51) Int. Cl.

| | |
|---|---|
| ***H02G 1/00*** | (2006.01) |
| ***H01R 24/40*** | (2011.01) |
| ***H01R 43/22*** | (2006.01) |

(52) U.S. Cl.
USPC .................................................. 29/758; 7/107

(58) Field of Classification Search
CPC ...................................................... H02G 1/005
USPC ........ 29/745, 750, 758, 760, 762, 764, 564.4, 29/564.5, 566.1, 566.3, 566.4, 828; 269/288, 295, 87.2; 81/9.51; 30/90.1, 30/90.2, 90.6, 286, 288, 289; 385/15, 88; 7/107
See application file for complete search history.

(56) References Cited

U.S. PATENT DOCUMENTS

| | | | | |
|---|---|---|---|---|
| 3,370,353 | A * | 2/1968 | Weissman et al. | 30/233 |
| 3,783,321 | A * | 1/1974 | Patterson | 361/772 |
| 3,869,945 | A * | 3/1975 | Zerver | 81/125 |
| 3,878,606 | A * | 4/1975 | Hug | 30/90.1 |
| 4,559,704 | A * | 12/1985 | Michael, III | 30/90.1 |
| 4,802,512 | A * | 2/1989 | Kodera | 140/149 |
| 5,306,101 | A * | 4/1994 | Rockower et al. | 405/184.3 |
| 5,551,111 | A * | 9/1996 | Murphy | 7/138 |
| 5,730,812 | A * | 3/1998 | Lawrence | 148/590 |
| 6,095,858 | A * | 8/2000 | Emery | 439/578 |
| 6,513,244 | B1 * | 2/2003 | Andreescu | 30/90.2 |
| 6,811,447 | B2 * | 11/2004 | Pfister et al. | 439/700 |
| 7,208,966 | B2 * | 4/2007 | Aoyagi et al. | 324/762 |
| 2006/0281370 | A1 * | 12/2006 | Mahoney et al. | 439/700 |
| 2008/0034574 | A1 * | 2/2008 | Gambardella et al. | 29/566.4 |

FOREIGN PATENT DOCUMENTS

| | | | |
|---|---|---|---|
| EP | 1119079 | A1 * | 7/2001 |
| FR | 2875727 | A1 * | 3/2006 |

* cited by examiner

*Primary Examiner* — Livius R Cazan
(74) *Attorney, Agent, or Firm* — Patent Capital Group

(57) ABSTRACT

A cutting guide for trimming the center conductor of a stinger. The cutting guide may include a housing that is adapted to receive the stinger conductor and provide a reference plane for trimming the conductor to a desired length. The housing may include a receiving end for receiving a predetermined portion of the stinger and an exit end through which an excess portion of the conductor protrudes beyond the desired cutting plane. The housing may include a socket having a receiving space for receiving the threads of the conductor and a barrel having a bore through which the stinger extends. Alternative embodiments include a length-adjustable housing and a housing with multiple bore lengths.

17 Claims, 3 Drawing Sheets

STINGER CUTTING GUIDE

TECHNICAL FIELD

The present invention relates to an apparatus for preparing a stinger for installation with a coax device, and more particularly, to a stinger cutting guide for trimming a center conductor of a stinger to a desired length.

BACKGROUND OF THE INVENTION

The cable telecommunications industry has traditionally employed metallic coaxial ("coax") cabling to deliver video signals. Conductors that transport these signals are typically connected within a telecommunications network to various coax devices such as nodes, amplifiers, and line extenders. The conductors are typically connected to the coax devices with connectors designed to minimize signal loss and match impedance values.

Coax devices may be located indoors or outdoors and may be ground-installed or aerially hung from a conductor strand. Whether a coax device is mounted inside a cabinet affixed to the ground, or installed aerially, a technician typically installs a stinger, a device known in the art for providing a RF connection, through a penetration in the coax device housing. The stinger typically comprises a hollow metallic shell threaded on the outside, a center conductor, and a dielectric interposed between the conductor and the inner surface of the shell. The center conductor projects axially from the stinger such that the device resembles a bee stinger, hence the name. There are various types and styles of stingers known in the art, with some stingers designed for lab testing and some designed for field-use. In a lab-test style stinger, the end opposing the projecting conductor typically has a RF terminal. The field-use stinger typically has a mechanism for capturing and transferring electrical signals to the shield and conductor of a coaxial cable.

To install a stinger into a coax device, the stinger is typically threaded into the coax device housing so that the center conductor projects within the housing to a predetermined position so that electrical connection is made between the stinger and a stinger receiving means within the housing. A typical stinger receiving means comprises a seizing connector that is adapted to seize the inserted center conductor.

In order for a stinger to be accurately installed and make a good electrical connection with the stinger receiving means, the center conductor must be of an appropriate length. Typically, a technician trims the center conductor to a length appropriate for the particular coax device to which the stinger is to be installed. To assist technicians in making a proper cut of the center conductor, a reference line may be provided at the base of the coaxial device housing. The reference line is typically provided a predetermined distance from the edge of the housing so that the distance between the housing edge and the reference line defines the appropriate stinger conductor length. The technician holds the stinger to the housing base and trims the center conductor at a point corresponding to the reference line. The center conductor may then be deburred using a file.

This prior art technique has several drawbacks, however. First, changing technology has necessitated increasingly accurate conductor lengths. Thus, whereas this prior art method of "eyeballing" the conductor against a reference line on the housing was once sufficiently accurate, it now often leads to conductor lengths outside of acceptable tolerances. These inaccurate conductor lengths require repair and increase installation time. Furthermore, it is often difficult to access the afore-mentioned reference line on the coaxial device housing, which may be inaccessible or require that the device be turned upside down. In addition, because the prior art method requires the use of a reference line on the coax device housing to determine a proper conductor length, the technician must be in the vicinity of the housing in order to prepare the stinger for installation. The prior art technique also does not provide uniform cut angles and the filing of the cut ends often results in inconsistent conductor shapes.

Thus, there is a need for a method and system that simplifies the process of preparing a stinger for connection with a coax device and which provides for accurate cuts of a stinger center conductor. There is also a need for a method and system that allows for the preparation of a stinger when a user is not in the vicinity of a coax device housing, thereby allowing technicians to precut conductor lengths away from a job site. There is also a need for a method and system that allows for the easy deburring of a stinger center conductor and results in consistent cut angles and conductor shapes.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the invention. Moreover, in the drawings, like reference numerals designate corresponding parts through the several views.

DETAILED DESCRIPTION OF THE PREFERRED EMBODIMENTS

The preferred embodiments of the present invention are described in the context of a cutting guide for a stinger or hard-lined coaxial cable. More specifically, a guide is provided for establishing a desired cut length of a center conductor of a stinger. The following describes structural aspects of various exemplary embodiments of the invention and it should be kept in mind that the embodiments are merely examples of the invention and that the present invention may take various and alternate forms.

Figure 1:
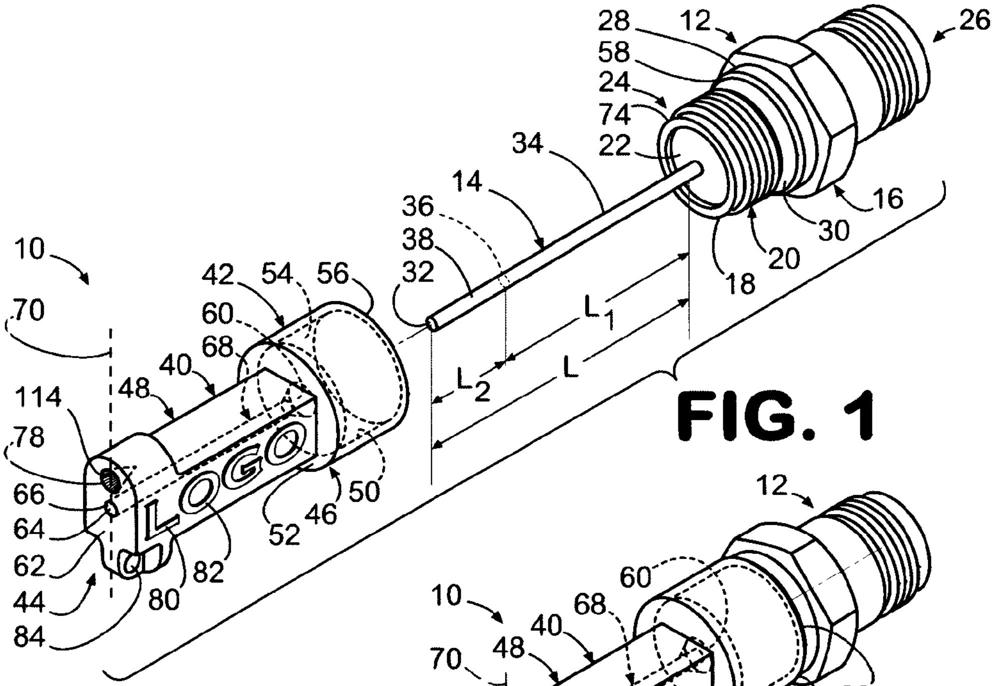
FIG. 1 is a perspective view of a stinger cutting guide and a stinger in accordance with a first exemplary embodiment of the invention.
Figure 5:
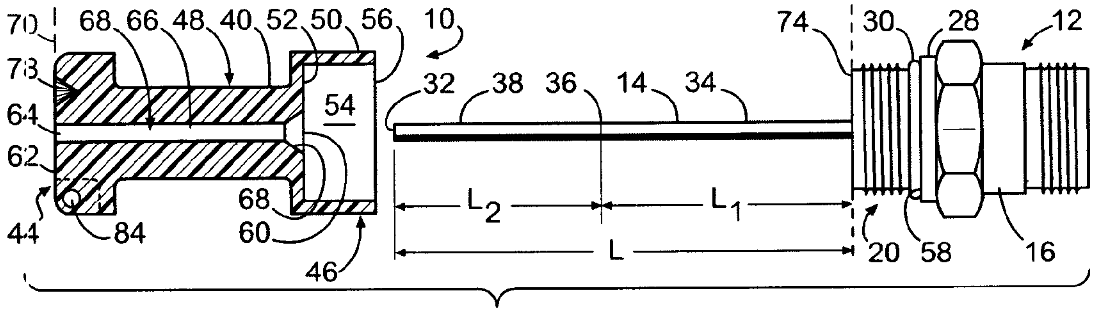
FIG. 5 shows a cross sectional view of an exemplary embodiment of a stinger cutting guide and a stinger.

Referring in more detail to the drawings, FIGS. 1 and 5 show an example of a stinger cutting guide 10 in accordance with a first exemplary embodiment of the invention. As will be described in more detail below, the cutting guide 10 is adapted for engagement with a stinger 12 to establish a desired length of a center conductor 14 of the stinger 12.

Prior to discussing the cutting guide 10 in detail, an exemplary stinger 12 with which it may be used will briefly be described. In this example, the stinger 12 includes a housing 16 comprising a hollow cylindrical shell 18 with a threaded portion 20, a center conductor 14 coaxial with the shell 18, and a dielectric 22 interposed between the conductor 14 and the inner surface of the shell 18. The diameter of dielectric 22 may be approximately seven times the diameter of center conductor 14, and the outer diameter of shell 18 may be approximately ten times the diameter of center conductor 14. The conductor 14 extends from a first side 24 of the stinger housing 16 and is adapted to transfer a non-grounded signal received at a network side 26 of the stinger 12 to the inside of a housing of a coax device (not shown) to which the stinger 12 is installed. The conductor 14 is typically forced into contact with a connecting means (not shown) inside the coax device housing which is typically referred to as a seizure mechanism. The stinger 12 includes a bulkhead 28 and an O-ring 30 provided on the threaded portion 20 adjacent the bulkhead 28, the bulkhead 28 having a larger outer diameter than the O-ring 30. The stinger conductor 14 is shown having an initial precut length L extending from the stinger housing 16 to tip 32. This initial length L is longer than the appropriate length needed for installation with the coaxial device. Thus, the precut length L of the conductor 14 may be viewed as being formed of a desired portion 34 of the conductor 14 of a length L1 that extends from the end of the stinger housing 16 to a predetermined cutting point 36 and an excess portion 38 that should be trimmed from the conductor 14 prior to installation having a length L2 that extends from the cutting point 36 to the tip 32. The position of the cutting point 36 may vary depending upon the particular coax device into which the stinger 12 will be installed.

Figure 2:
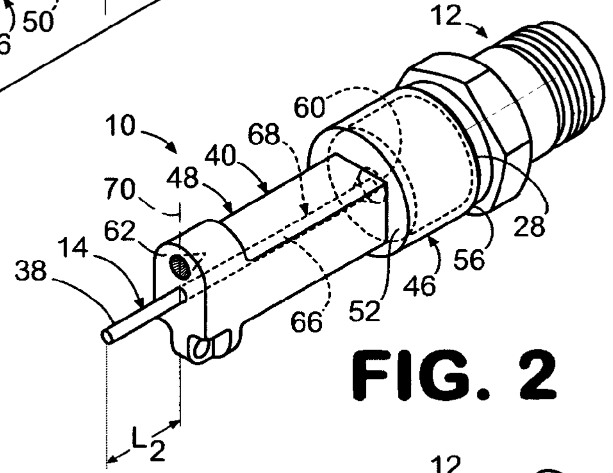
FIG. 2 shows a perspective view of a stinger received within the stinger guide of FIG. 1.
Figure 6:
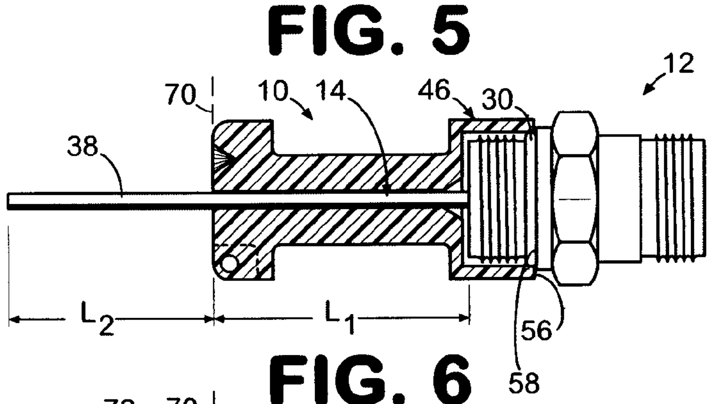
FIG. 6 shows the stinger cutting guide of FIG. 5 receiving a stinger so that a portion of the center conductor protrudes from the cutting guide.

The cutting guide 10 of the invention includes a housing 40 having a receiving end 42 for receiving a portion of the stinger 12 and an exit end 44 adapted for the protrusion of a portion of the center conductor 14 of the stinger 12. In this exemplary embodiment, the guide housing 40 includes a cylindrically-shaped hollow socket 46 at the receiving end 42 and a barrel 48 attached to the socket 46 and extending to the exit end 44. The socket 46 has a sidewall 50 extending from a base wall 52 that defines a receiving space 54 for receiving a portion of the stinger 12. In this case, the socket 46 is circular in cross section and shaped to snugly receive the threaded portion 20 and O-ring 30 of the stinger 12. The end of the socket sidewall defines a contact surface 56 for abutting the stinger 12. In this case, the cutting guide 10 is arranged so that the contact surface 56 contacts the face 58 of the stinger bulkhead 28. Thus, as shown in FIGS. 2 and 6, when the stinger 12 is inserted into the guide 10 the contact surface 56 of the sidewall 50 abuts the bulkhead face 58 thereby preventing further insertion of the stinger 12 into the cutting guide 10, thereby placing the stinger 12 in a desired cutting position within the cutting guide 10. Preferably, the socket 46 is sized so that it fits snugly over the O-ring 30 to provide a friction fit that stabilizes the stinger 12 within the cutting guide 10.

The barrel 48 of the cutting guide 10 may be formed of a solid material and include an entry port 60 adapted to receive the center conductor 14 of the stinger 12. An end wall 62 is provided that is spaced a predetermined distance from the contact surface 56 of the socket 46 and includes an exit port 64 adapted to receive the center conductor 14 of the stinger 12. The entry port 60 and the exit port 64 are aligned so as to allow extension of the center conductor 14 through both the entry 60 and the exit port 64. The barrel 48 has an inner bore 66 extending from the entry port 60 to the exit port 64 to assist in guiding the conductor 14 through the barrel 48. The bore 66 defines a receiving channel for receiving the center conductor 14 of the stinger 12. The bore 66 connects with the receiving space 54 of the socket 46 to define a continuous path 68 for the stinger conductor 14 through the guide 10. A generally funnel-shaped recess 116 may be provided at the entry port 60 to assist in guiding the center conductor 14 into the bore 66 when the stinger 14 is inserted into the cutting guide 10.

As shown in FIGS. 2 and 6, the bore 66 of the barrel 48 is connected to the receiving space 54 of the socket 46 so that when the stinger 12 is inserted into the guide 10 the stinger center conductor 14 extends through the socket 46 and the barrel 48 so that a portion of the conductor protrudes from the guide housing 40. The cutting guide 10 is pre-measured and arranged so that the end wall 62 of the housing 40 defines a cutting reference plane 70 for trimming the end of the center conductor 14 to a desired length. Thus, in this exemplary embodiment the barrel end wall 62 and the socket contact surface 56 of the guide 10 are sized so that when the stinger 12 is inserted into the socket 46 so that the contact surface 56 contacts the bulkhead 28 of the stinger 12 as described above, the portion of the conductor 14 protruding from the barrel 48 from the exit port 64 represents the excess length L2 of the conductor 14. Thus, the vertical outer surface of the endwall 62 of the barrel 48 serves as a cutting reference plane 70 for trimming the conductor 14 to a desired length.

Figure 3:
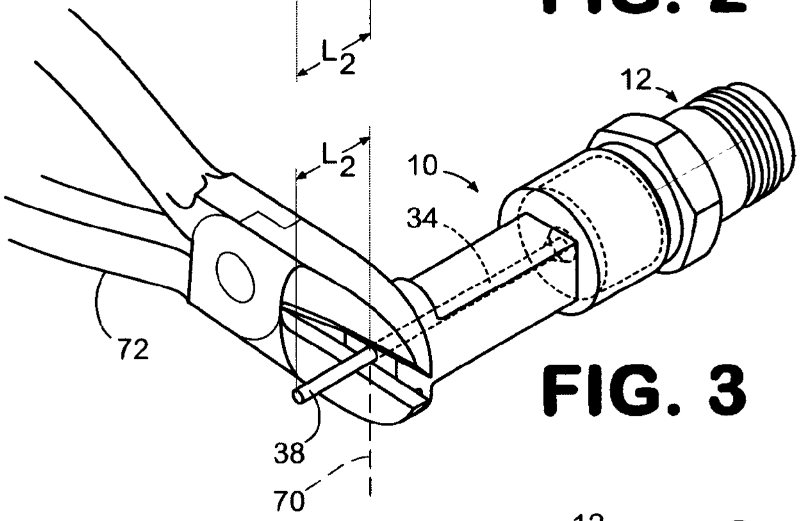
FIG. 3 shows the portion of a stinger center conductor protruding from the stinger cutting guide being trimmed by wire cutters.
Figure 4:
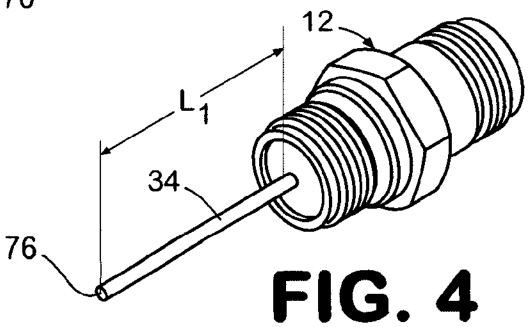
FIG. 4 shows the stinger of FIG. 1 having a desired center conductor length.
Figure 7:
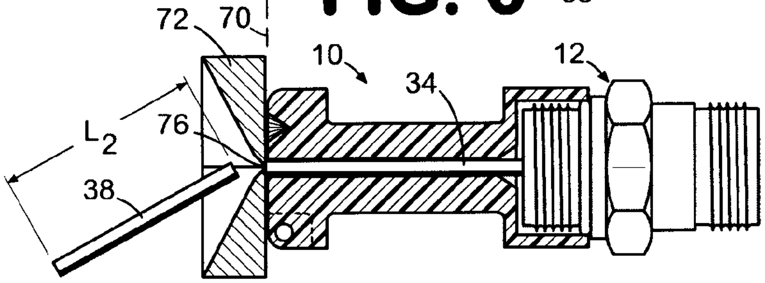
FIG. 7 shows the stinger cutting guide of FIG. 5 being used in conjunction with a wire cutter to trim the center conductor of the stinger to a desired length.

As shown in FIGS. 3 and 7, the excess portion 38 of a length L2 protruding from the barrel 48 may be removed using wire cutters 72 to provide a desired portion 34 of the stinger 12 with a desired conductor length L1 as shown in FIG. 4. Preferably, wire cutters or dikes that provide a cut that is generally flush with the barrel end wall 62 are used.

While in the exemplary embodiment discussed above the endwall of the socket 46 serves as a contact portion 56 for contacting the stinger 12 and placing the stringer in a proper cutting position, it is contemplated that other contact surfaces may be used. For example, the base wall 52 of the socket 46 may be adapted for contact with the front end 74 of the stinger housing 16 so that when the stinger 12 is inserted into the guide 10 the front end 74 of the stinger 12 abuts the base wall 52 of the barrel 48.

Figure 8:
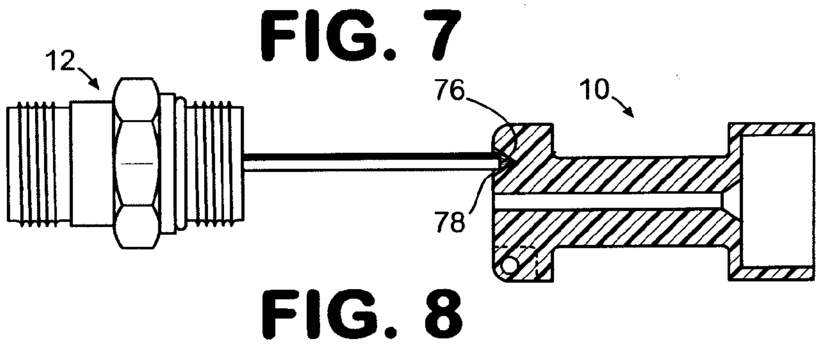
FIG. 8 shows the stinger cutting guide of FIG. 5 receiving the center conductor of a stinger in a deburrer.

Once the center conductor 14 has been trimmed, a user can deburr the newly cut conductor tip 76. As seen in FIG. 1, a deburrer 78 in the form of a cone-shaped recess is provided at the end wall 62 of the guide barrel 48. The recess may be lined with an abrasive material 114, such as by way of example and not limitation, carbide for contacting the tip 76. As shown in FIG. 8, the trimmed conductor 14 may simply be rotated in the deburrer 78 to remove unwanted burrs.

Preferably the guide housing 40 is made of non-conductive material, such as ABS. In this exemplary embodiment, the guide housing 40 is about 1.9 inches long, the socket 46 has an inner diameter of about 0.675 inches and an outer diameter of about 0.8 inches, and the cutting guide is adapted 10 to provide a cutting a conductor length of about 1.55 inches, measured from the end of the stinger housing 74 to the tip 32 of the conductor 14, which is a length commonly used in the cable telecommunications industry. It is contemplated however that the guide 10 may be adapted to provide other center conductor lengths by lengthening or shortening the guide housing 40 or changing the various contact surfaces 56. In addition, the bore 66 in this case is circular in cross section with a diameter of about 0.09 inches which can receive standard center conductor lengths. It is also contemplated that the bore size may be varied for different center conductor sizes.

It is contemplated that the stinger cutting guide 10 of the present invention may be used by technicians in the field. Conveniently, the guide 10 is of a size that may be readily placed in a toolbox or attached to a key chain by an attaching loop 84. The barrel 48 is generally rectangular in cross section having flat sidewalls 80 that provide a convenient surface for the application of indicia 82 such as advertising, logos, instructions, etc. By way of example and not limitation, the indicia may indicate a company name or logo, a list of the coax devices for which use of the guide is appropriate, or the cut length provided by the cutting guide 10.

Figure 9:
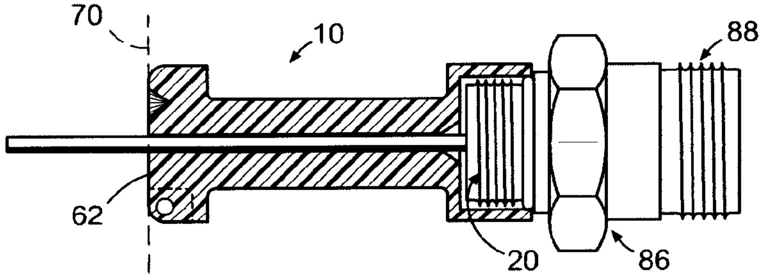
FIG. 9 shows the stinger cutting guide of FIG. 5 engaged with another stinger.

It is also contemplated that the cutting guide 10 may be used with a variety of stingers. For example, a stinger 86 shown in FIG. 9 may also be trimmed to a desired conductor length L1 although the network portion 88 of the stinger 86 in FIG. 9 has a larger diameter than the network portion 26 of the stinger 12 of FIG. 1. In this case, the threaded portions 20 and O-rings 30 of both stingers 12; 88 are of similar size for connection with a coax device (not shown). Thus, the contact surface 56 of the guide socket 46 abuts the bulkhead 28 of the stinger 86 in the same way as described above in conjunction with the stinger 12 of FIG. 1 and provides an appropriate cutting plane 70. Furthermore, it is contemplated that the present invention may be used for preparing center conductor lengths of stingers for connection with a variety of different devices by varying the cutting reference plane 70 of the housing to a corresponding desired length. Likewise, the barrel 48 and socket 46 may be adapted for different stinger sizes.

Figure 10:
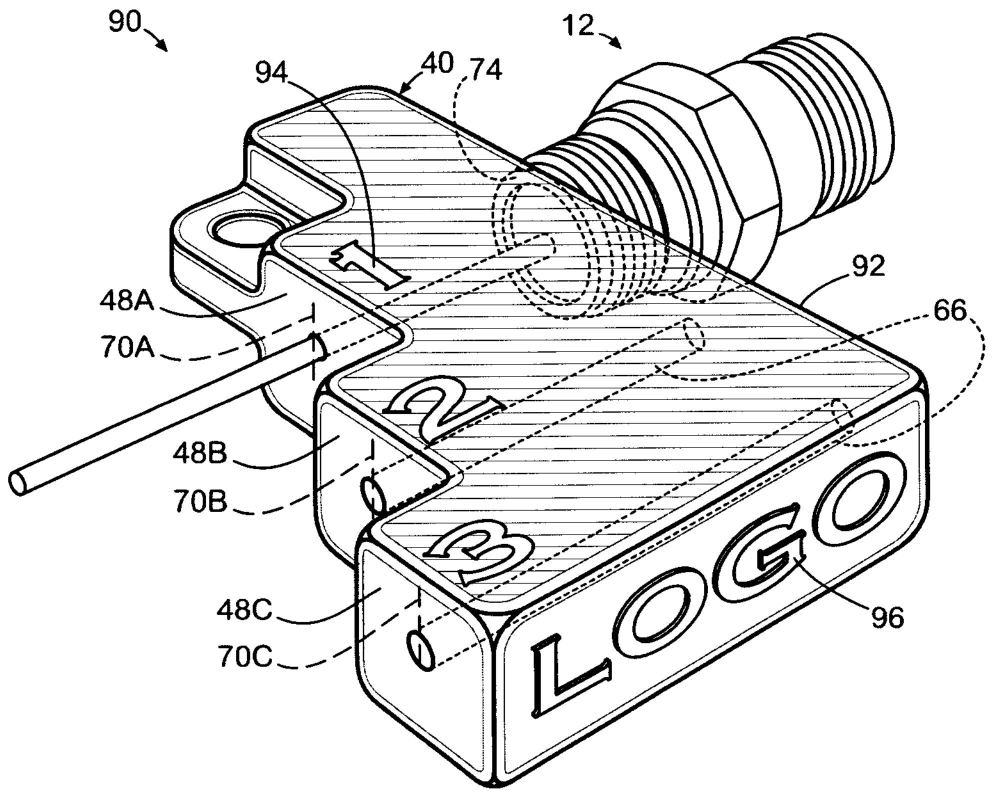
FIG. 10 shows a perspective view of a stinger cutting guide in accordance with another exemplary embodiment of the invention.

FIG. 10 shows another exemplary embodiment of the invention in which a cutting guide 90 is provided with means to establish several different conductor lengths. This arrangement allows a technician to carry a single tool that can be used for preparing stingers for different coax devices, such as equipment from different manufacturers, that require different conductor lengths. In this embodiment, the cutting guide 90 is provided with three barrels, 48A, 48B, and 48C of different lengths for establishing different cutting reference planes 70A, 70B, 70C that correspond to the desired stinger conductor lengths for different coax devices. A socket is not provided as in the embodiment of FIG. 1 but instead the guide 90 is arranged so that a wall 92 of the guide housing 40 serves as a contact surface that is adapted to contact the end 74 of the stinger housing 16. A user can simply select which barrel 48A-C to use depending upon the desired conductor length for the particular coaxial device. Each barrel 48A-C may be provided with indicia 94 indicating the length of the barrel, the coax devices for which each particular barrel, or other information, such as a logo 96. It is also contemplated that the bores 66 of the barrels 48A-C may be vary in size to accommodate different diameter stinger conductors 14.

Figure 11:
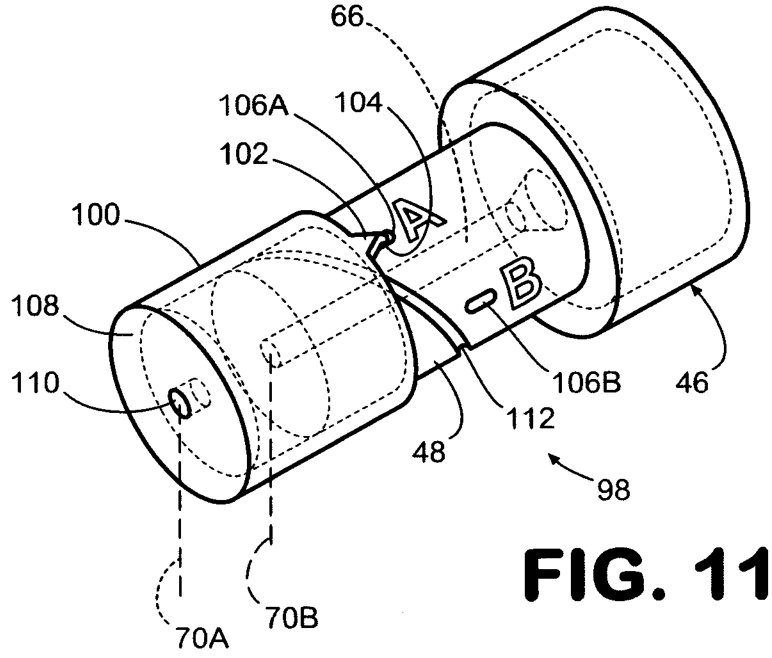
FIG. 11 shows a perspective view of a stinger cutting guide in accordance with another exemplary embodiment of the invention.

FIG. 11 shows another exemplary embodiment of the invention in the form of an adjustable cutting guide 98 that is adapted to provide multiple cutting reference planes 70A-B. Many of the elements of this embodiment are similar to the embodiment of the cutting guide 10 discussed with reference to FIG. 1, such as the socket 46 and bore 66, and these features will not again be discussed in detail. Unlike the embodiment of FIG. 1, however, this exemplary cutting guide 98 includes an end cap 100 adjustably mounted to the barrel 48. The end cap 100 is provided with a pointer 102 having a downwardly extending tab 104 that is adapted for insertion into receiving apertures 106A-B in the surface of the barrel 48. An end wall 108 of the end cap 100 is provided with an exit port 110 that is aligned with the bore 66 of the barrel so that a stinger conductor 14 may extend through the bore 66 and the exit port 110 of the end cap 100 so that the end wall 108 of the end cap 100 establishes a cutting reference plane 70A for trimming an inserted stinger conductor 14 as discussed above. A channel guide 112 is provided in the surface of the housing into which a pin (not shown) located on the interior surface of the end cap 100 is slidably movable.

The end cap 100 may be moved from a first position for establishing a first cutting reference plane 70A to a second position for establishing a second cutting reference plane 70B by simply rotating the end cap 100 so that it moves along the barrel 48, the end cap pin (not shown) moving within the guide channel 112. Once the end cap 100 is in the proper position, it may be secured in place by the insertion of the tab 104 into a corresponding receiving aperture 106A-B. While shown as having two reference plane positions in FIG. 11 it is contemplated that more than two positions may be provided to create multiple cutting reference planes.

Thus, the present invention eliminates the need for a field or lab technician to measure the proper center conductor length of a stinger for preparing the stinger for installation with various coax devices such as nodes, line extenders, and amplifiers, such as the GS-7000 node and the GainMaker® system amplifiers and line extenders from Scientific-Atlanta, Inc. It also eliminates the need of the technician to be in contact with a coax device housing when making a conductor cut. This lowers installation time and reduces additional preparation time due to incorrect conductor length as well as insuring a good connection. Furthermore, the incorporation of a burr removal area further decreases the preparation time, decreases the chance of losing multiple tools, and provides a consistent conductor length and shape. It is contemplated that the guide could be sized for any variety of products that require preparation of a center conductor length according to the particular device's specifications.

In light of the foregoing disclosure of the invention and description of certain preferred embodiments, those who are skilled in this area of technology will readily understand that various modifications and adaptations can be made without departing from the true scope and spirit of the invention. All such modifications and adaptations are intended to be covered by the following claims. Thus, the foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An apparatus, comprising:

a housing having its length disposed between a first end wall and a second end wall, said housing comprising:

a receiving end having a cavity for receiving a portion of a stinger, said cavity extending from said first end wall to a base wall and having a first diameter, wherein said second end wall is adapted for protrusion of a portion of a conductor of said stinger;

a path between said first and second end walls adapted for receiving said conductor of said stinger, said path comprising said cavity having said first diameter and a bore having a second diameter that differs from said first diameter, said bore extending from an entry port in said base wall to said second end wall; and a deburrer for smoothing a trimmed stinger conductor tip, the deburrer comprising a recess having a closed end and being lined with abrasive material.

2. The apparatus of claim 1, wherein said receiving end comprises a contact portion for limiting insertion of said stinger into said housing adapted to contact a predetermined portion of said stinger, wherein said contact portion and said second end wall are separated by a predetermined distance so that said second end wall defines a cutting reference plane for cutting said conductor to a desired length.

3. The apparatus of claim 2, wherein said contact surface comprises said first end wall of said housing.

4. The apparatus of claim 1, wherein said receiving end comprises a socket adapted to receive a threaded portion of said stinger.

5. The apparatus of claim 1, wherein said housing is adapted to contact a bulkhead of said stinger to limit insertion depth of said conductor within said housing to establish a proper cutting position of said stinger with said housing.

6. The apparatus of claim 1, further comprising a barrel adapted to receive the conductor.

7. The apparatus of claim 1, wherein said bore has a diameter of 0.09 inches.

8. The apparatus of claim 1, wherein said housing has an unthreaded exterior.

9. The apparatus of claim 1 wherein the deburrer is disposed on the exterior of the second end wall.

10. An apparatus, comprising:

a socket having a first diameter including a receiving space defined by a sidewall and a base wall, said receiving space adapted to receive a shell of a stinger, said base wall having a first port adapted for receiving a portion of a conductor of said stinger;

a barrel connected with said socket at said base wall, said barrel having a flat sidewall and a bore adapted to receive said portion of a conductor of said stinger, said bore beginning at said first port and extending to a second port disposed in an opposite end of said barrel, said bore having a second diameter smaller than said first diameter;

wherein said barrel further comprises a deburrer configured for removing burrs from the tip of said stinger conductor, said deburrer comprising a recess having a closed end and being lined with an abrasive material.

11. The apparatus of claim 10, wherein said socket is adapted to receive a threaded portion of said stinger.

12. The apparatus of claim 10, wherein said second diameter is approximately 0.09 inches.

13. The apparatus of claim 10 wherein the deburrer is disposed on the exterior of an end wall of the barrel.

14. An apparatus, comprising:

a housing having its length disposed between first and second end walls, comprising:

a passage extending along said length between said opposing end walls, said passage having a first portion with a first diameter and a second portion with a second diameter, said first portion having a base wall with a planar surface and an entry port to said second portion, wherein said first portion of said passage is adapted for receiving a first portion of said stinger, said second portion of said passage is adapted for receiving a conductor of said stinger, said second portion of said passage extending to said second end wall, wherein said first end wall is adapted to allow said passage to receive said stinger, and said second end wall is adapted for protrusion of a portion of said conductor;

a deburrer for smoothing a trimmed stinger conductor tip, the deburrer comprising a recess having a closed end and being lined with an abrasive material.

15. The apparatus of claim 14, further comprising a contact surface adapted to contact a portion of said stinger to limit insertion of said stinger into said passage.

16. The apparatus of claim 14, wherein said housing has an unthreaded exterior.

17. The apparatus of claim 14 wherein the deburrer is disposed on the exterior of the second end wall.

* * * * *